US007313725B2

(12) United States Patent
Kroening et al.

(10) Patent No.: US 7,313,725 B2
(45) Date of Patent: Dec. 25, 2007

(54) REPLACEMENT RESTORATION DISK DRIVE AND METHOD

(75) Inventors: James L. Kroening, Dakota Dunes, SD (US); Paul R. Kayl, McCook Lake, SD (US)

(73) Assignee: Gateway Inc., Irvine, CA (US)

( * ) Notice: Subject to any disclaimer, the term of this patent is extended or adjusted under 35 U.S.C. 154(b) by 798 days.

(21) Appl. No.: 10/629,494

(22) Filed: Jul. 29, 2003

(65) Prior Publication Data

US 2005/0028027 A1     Feb. 3, 2005

(51) Int. Cl.
*G06F 11/00* (2006.01)
(52) U.S. Cl. ............................................. 714/15; 714/7
(58) Field of Classification Search .................... 714/6, 714/7, 15, 42; 707/202, 204
See application file for complete search history.

(56) References Cited

U.S. PATENT DOCUMENTS

| 5,307,261 | A |  | 4/1994 | Maki et al. | |
|---|---|---|---|---|---|
| 5,966,732 | A |  | 10/1999 | Assaf | |
| 6,081,789 | A | * | 6/2000 | Purcell | 705/37 |
| 6,281,894 | B1 |  | 8/2001 | Rive | |
| 6,360,945 | B1 |  | 3/2002 | Drew | |
| 6,519,762 | B1 | * | 2/2003 | Colligan et al. | 717/170 |
| 6,662,284 | B2 | * | 12/2003 | Gold | 711/163 |
| 6,845,466 | B2 | * | 1/2005 | Gold | 714/7 |
| 2002/0059570 | A1 | * | 5/2002 | Yoo | 717/170 |
| 2002/0083367 | A1 | * | 6/2002 | McBride et al. | 714/15 |
| 2002/0133741 | A1 | * | 9/2002 | Maeda et al. | 714/7 |
| 2005/0010616 | A1 | * | 1/2005 | Burks | 707/204 |

OTHER PUBLICATIONS

Power Quest—www.powerquest.com/driveimage/didetails.cfm—Drive Image 7 Product Details.

* cited by examiner

*Primary Examiner*—Scott Baderman
*Assistant Examiner*—Joshua Lohn
(74) *Attorney, Agent, or Firm*—Ross F. Hunt, Jr.; Stites & Harbison PLLC

(57) ABSTRACT

A method of restoring a computer system to a state it was in when it left the factory starts with receiving a request for a new disk drive for the system. An extended parts list for the computer system is retrieved from a database or other data repository and written on the new disk drive. Software to restore the system, including operating system software and application software is also provided on the new disk drive. When the new disk drive is installed, the restoration software uses the extended parts list to select operating system software and application software to restore the computer and reboot the computer with the restored software.

14 Claims, 3 Drawing Sheets

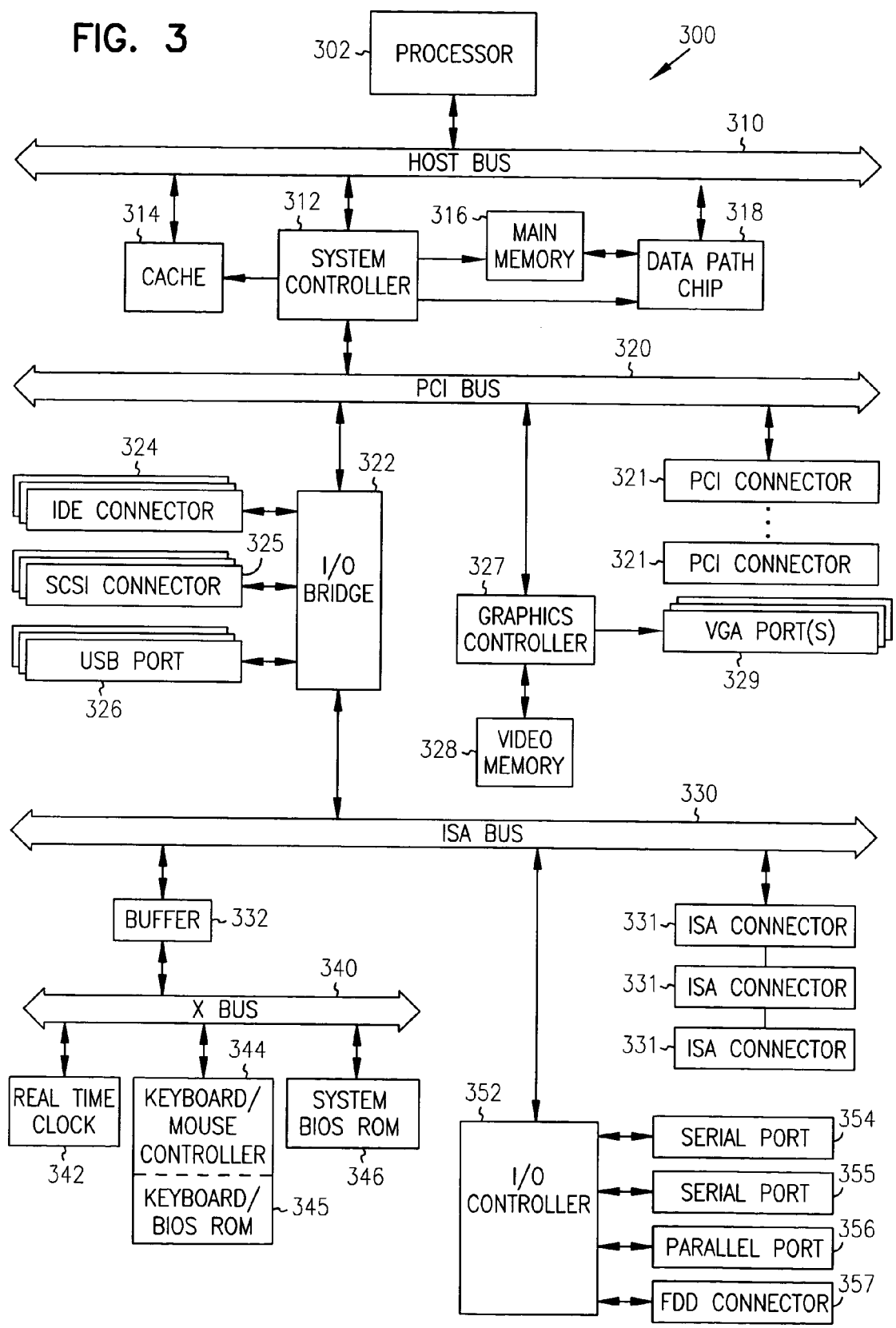

REPLACEMENT RESTORATION DISK DRIVE AND METHOD

RELATED APPLICATIONS

U.S. Pat. No. 5,966,732 and U.S. patent application Ser. No. 09/866,332 each involve aspects of reserve areas and methods of interacting with reserve areas. This application hereby incorporates by reference in their entirety U.S. patent application Ser. No. 09/866,332, filed on May 25, 2001, and U.S. Pat. No. 5,966,732 which issued Oct. 12, 1999. The '332 patent application and the '732 patent are each assigned to the assignee of the present application.

FIELD OF THE INVENTION

The present invention relates to replacing disk drives in a computer system, and in particular to a replacement disk drive that provides restoration of the computer system.

BACKGROUND OF THE INVENTION

Many personal computers are shipped with a hard disk drive that contains a host protected area, part of which serves as a substitute for a system restore CD in a free lot manufacturing process. The hard drive thus contains information and programming to restore the personal computer to the same state in which it was shipped to a customer from a manufacturer. When the system is initially shipped, the manufacturing automated software has knowledge of the system content, and thus provides the correct operating system software and hardware drivers in the host protected area.

When a hard disk drive fails after being in the field, however, the replacement of a such a hard drive becomes very difficult. The restore CD may be lost or misplaced by the customer. Technical support staff may generate notes in a text field based on discussions with the customer, and an educated guess may be made based on such text as to what operating system software is required for the replacement drive. This process results in many further calls from customers regarding how to complete the process of restoring a personal computer. It adds both to cost, and customer frustration.

SUMMARY OF THE INVENTION

A method of restoring a computer system to a state it was in when it left the factory starts with receiving a request for a new disk drive for the system. An extended parts list for the computer system is retrieved from a database or other data repository and written on the new disk drive. Software to restore the system, including operating system software and application software is also provided on the new disk drive. When the new disk drive is installed, the restoration software uses the extended parts list to select operating system software and application software to restore the computer.

In one embodiment, once the disk drive is installed, the system is turned on, and a boot is detected. The restore process is begun, causing rebuilding of the operating system and then a reboot into the rebuilt operating system.

In a further embodiment, the extended parts list and other software used in the restoration process is stored on a host protected area. The computer system boots to the host protected area, runs the restore process to select drivers and rebuild the operating system and applications, and then causes a reboot into the operating system in the user area of the disk.

BRIEF DESCRIPTION OF THE DRAWINGS

FIG. 3 is a block diagram of an example computer for implementing certain aspects of the present invention.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware of any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

Figure 1:
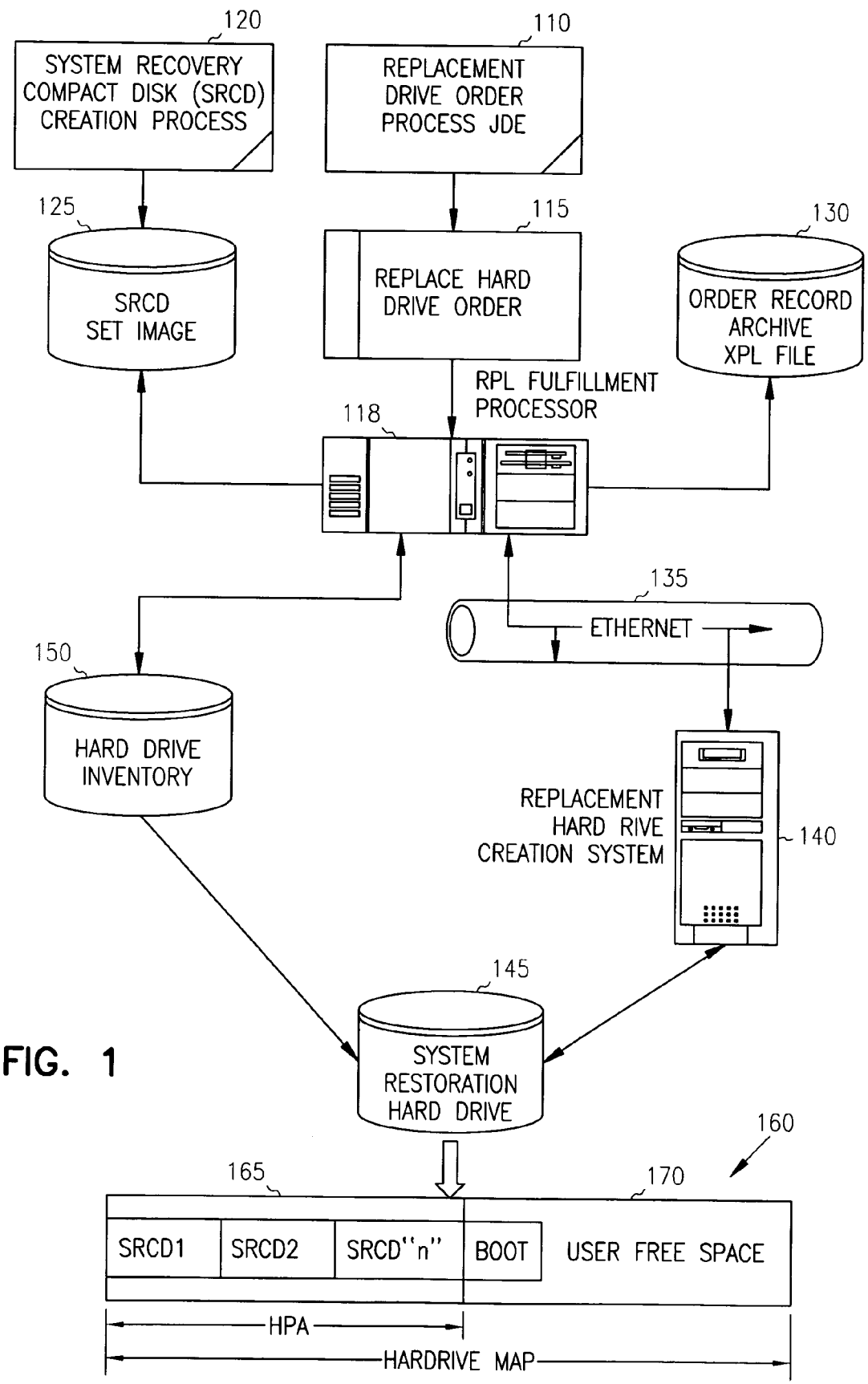
FIG. 1 is a flowchart showing a process for creating a replacement hard drive using an extended parts list.

FIG. 1 is a flowchart showing creation of a replacement hard disk drive for a system that had already shipped to a customer. The replacement hard disk drive may be needed due to failure of the original disk drive, or for numerous other causes. A customer calls or emails an order for a replacement hard drive at 110. The order may also come from tech support, after exploring possible causes of malfunction of the computer system. An order for a replacement hard disk drive is created at 115, and sent to a replacement fulfillment processor at 118. Replacement fulfillment processor 118 may be a stand alone computer system, or simply representative of a process running on a computer.

The replacement fulfillment processor 118 is also coupled to a system recover compact disk creation process 120, that produces a system recover CD image at 125. The replacement fulfillment processor 118 also interacts with an order record archive 130 which stores copies of an extended parts list (XPL) file for each computer manufactured. The replacement fulfillment processor 118 is coupled via a network 135, such as an Ethernet network or any other type of communication means to a replacement hard drive creation system 140, which again may be a stand alone computer or process running on a multipurpose computer system. The replacement hard drive creation system 140 creates a system restoration hard drive 145. Hard drive 145 is selected from a hard drive inventory 150, that is further coupled to the replacement fulfillment processor 118 to ensure that an appropriate disk drive is available to fulfill the order.

Replacement hard drive creation system 140 uses the XPL file to select software, including operating system software to store on the replacement hard drive 145. It also includes the system recover CD image 125 and the XPL file for use during the restoration process.

The restoration information on the hard drive is represented by a simplified hard drive map 160. The map has a host protected area 165, and a user free space area 170. The host protected area 165 is an area that is not generally accessible by the user to provide a secure location for the restoration information in one embodiment. Multiple system restore CD images may be provided in host protected area 165. In a further embodiment, the system restore CD images may reside in the user free space 170. User free space 170 further contains a user boot portion to boot the computer system once the restoration is complete.

Figure 2:
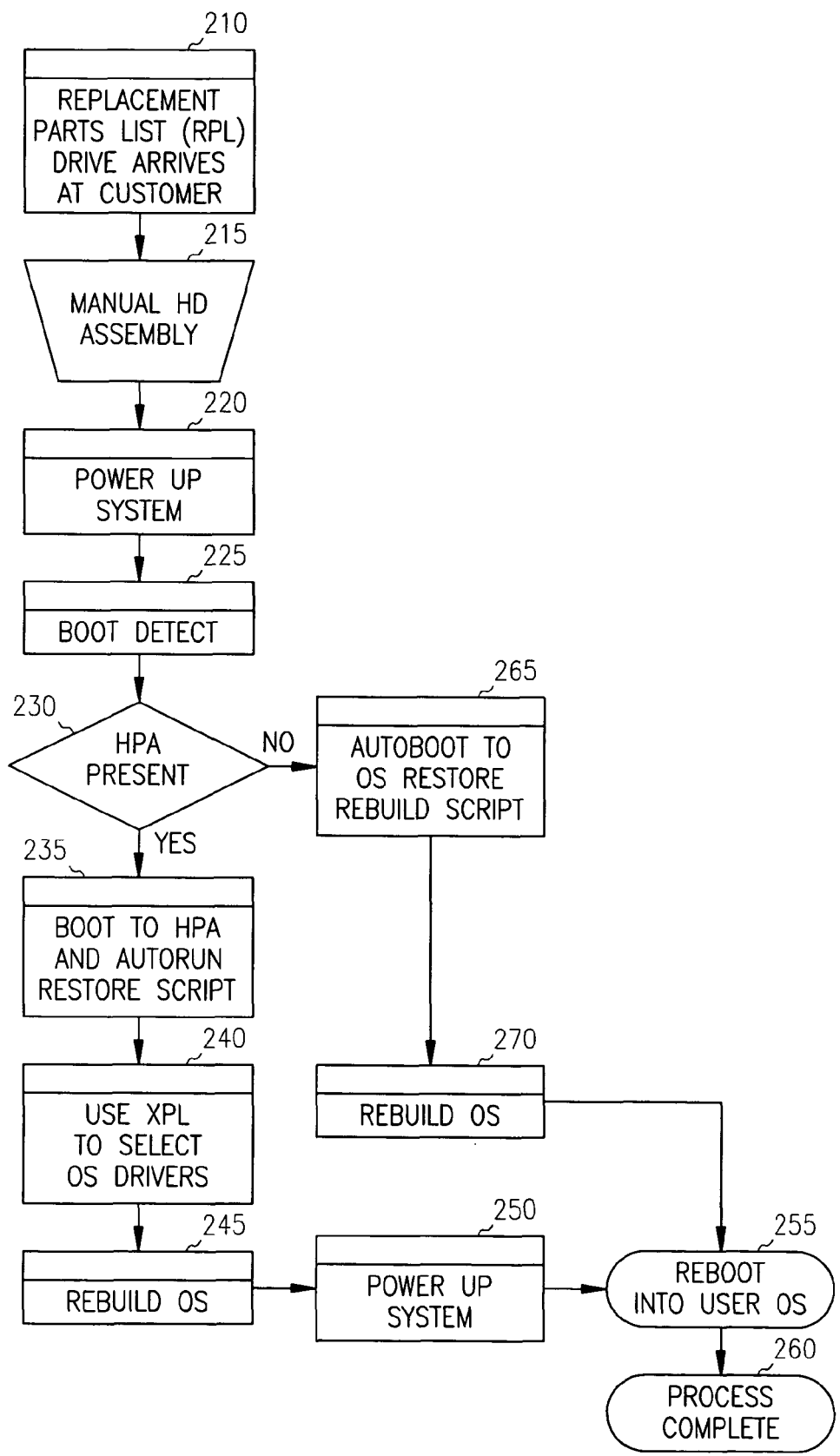
FIG. 2 is a flowchart showing a process for restoring a computer system using a replacement hard drive.

Use of the restoration hard drive is shown in flow chart form in FIG. 2. At 210, the restoration drive, also referred to as a replacement parts list (RPL) drive is received by the customer. The replacement part list is the same as the extended parts list, except that the extended parts list is also used during manufacturing to assemble the computer system from parts.

At 215, the disk drive is manually assembled or installed into the computer system by the customer, or a service technician. Upon completion of assembly, the computer system is powered up at 220. A boot program is detected at 225. If a host protected area is present as indicated at 230, a boot to the host protected area is performed as indicated at 235. Also at 235, a restore script is run automatically. The restore script may be the same as that used in a restoration CD. However, since the customer may have lost the restoration CD that shipped with the system, equivalent restoration information is provided in the restoration disk drive. The extended parts list is used at 240 to select operating system drivers consistent with hardware and software on the computer system. The operating system is then rebuilt at 245, and a maximum HD lock is set at 250 to cause booting from the user portion of the operating system at 255. The restoration process is then complete as indicated at 160.

If a host protected area is not detected as present at 230, an autoboot to operating system restore rebuild script on the restoration disk is performed. The operating system is then rebuilt at 270, followed by reboot into the operating system at 255 and completion at 260. The computer system is now in the same state as initial shipment, having the same operating system and software.

FIG. 3 is a block diagram of a computer system 300 that shows components found in a common computer system such as a personal computer for use in implementing selected portions of the flowcharts shown in FIGS. 1 and 2. Computer system 300 comprises a processor 302, a system controller 312, a cache 314, and a data-path chip 318, each coupled to a host bus 310. Processor 302 is a microprocessor such as a 486-type chip, a Pentium®, Pentium® II, Pentium® III, Pentium® 4, or other suitable microprocessor. Cache 314 provides high-speed local-memory data (in one embodiment, for example, 512 kB of data) for processor 302, and is controlled by system controller 312, which loads cache 314 with data that is expected to be used soon after the data is placed in cache 314 (i.e., in the near future). Main memory 316 is coupled between system controller 312 and data-path chip 318, and in one embodiment, provides random-access memory of between 16 MB and 256 MB or more of data. In one embodiment, main memory 316 is provided on SIMMs (Single In-line Memory Modules), while in another embodiment, main memory 316 is provided on DIMMs (Dual In-line Memory Modules), each of which plugs into suitable sockets provided on a motherboard holding many of the other components shown in FIG. 3. Main memory 316 includes standard DRAM (Dynamic Random-Access Memory), EDO (Extended Data Out) DRAM, SDRAM (Synchronous DRAM), or other suitable memory technology. System controller 312 controls PCI (Peripheral Component Interconnect) bus 320, a local bus for system 300 that provides a high-speed data path between processor 302 and various peripheral devices, such as graphics devices, storage drives, network cabling, etc. Data-path chip 318 is also controlled by system controller 312 to assist in routing data between main memory 316, host bus 310, and PCI bus 320.

In one embodiment, PCI bus 320 provides a 32-bit-wide data path that runs at 33 MHz. In another embodiment, PCI bus 320 provides a 64-bit-wide data path that runs at 33 MHz. In yet other embodiments, PCI bus 320 provides 32-bit-wide or 64-bit-wide data paths that run at higher speeds. In one embodiment, PCI bus 320 provides connectivity to I/O bridge 322, graphics controller 327, and one or more PCI connectors 321 (i.e., sockets into which a card edge may be inserted), each of which accepts a standard PCI card. In one embodiment, I/O bridge 322 and graphics controller 327 are each integrated on the motherboard along with system controller 312, in order to avoid a board-connector-board signal-crossing interface and thus provide better speed and reliability. In the embodiment shown, graphics controller 327 is coupled to a video memory 328 (that includes memory such as DRAM, EDO DRAM, SDRAM, or VRAM (Video Random-Access Memory)), and drives VGA (Video Graphics Adaptor) port 329. VGA port 329 can connect to industry-standard monitors such as VGA-type, SVGA (Super VGA)-type, XGA-type (extended Graphics Adaptor) or SXGA-type (Super XGA) display devices.

Other input/output (I/O) cards having a PCI interface can be plugged into PCI connectors 321. Network connections providing video input are also represented by PCI connectors 321, and include Ethernet devices and cable modems for coupling to a high speed Ethernet network or cable network which is further coupled to the Internet.

In one embodiment, I/O bridge 322 is a chip that provides connection and control to one or more independent IDE or SCSI connectors 324–325, to a USB (Universal Serial Bus) port 326, and to ISA (Industry Standard Architecture) bus 330. In this embodiment, IDE connector 324 provides connectivity for up to two standard IDE-type devices such as hard disk drives, CDROM (Compact Disk-Read-Only Memory) drives, DVD (Digital Video Disk) drives, video-cassette recorders, or TBU (Tape-Backup Unit) devices. In one similar embodiment, two IDE connectors 324 are provided, and each provide the EIDE (Enhanced IDE) architecture. In the embodiment shown, SCSI (Small Computer System Interface) connector 325 provides connectivity for up to seven or fifteen SCSI-type devices (depending on the version of SCSI supported by the embodiment). In one embodiment, I/O bridge 322 provides ISA bus 330 having one or more ISA connectors 331 (in one embodiment, three connectors are provided). In one embodiment, ISA bus 330 is coupled to I/O controller 352, which in turn provides connections to two serial ports 354 and 355, parallel port 356, and FDD (Floppy-Disk Drive) connector 357. At least one serial port is coupled to a modem for connection to a telephone system providing Internet access through an Internet service provider. In one embodiment, ISA bus 330 is connected to buffer 332, which is connected to X bus 340, which provides connections to real-time clock 342, keyboard/mouse controller 344 and keyboard BIOS ROM (Basic Input/Output System Read-Only Memory) 345, and to system BIOS ROM 346.

The invention claimed is:

1. A method of restoring a computer system, the method comprising:
   receiving a request for a new disk drive for an identified customer computer system;
   retrieving an extended parts list for the computer system;
   providing a self-executing restore program on the new disk drive, said self-executing restore program, when executed, restoring the computer system to original factory condition; and
   storing the extended parts list on the new disk drive for use by the self-executing restore program in restoring the computer system so that upon installation of the new, restoration disk drive, the self-executing restore program restores the computer system to the original factory condition.

2. The method of claim 1 wherein the restore program is stored on the new disk drive in a host protected area of the new disk drive.

3. The method of claim 1 wherein the restore program is an image of a system recovery compact disk program.

4. The method of claim 1 further comprising checking a hard disk drive inventory for a desired new disk drive.

5. A system for creating a replacement self-executing, system restore hard disk for a computer, the system comprising;
   a replacement fulfillment processor for executing the steps of:
      receiving a request for a new disk drive for an identified customer computer system:
      retrieving an extended parts list for the identified customer computer system; and
      retrieving a self-executing restore program that, when executed, restores the computer system to original factory condition; and
   a replacement hard drive creator that executes the steps of:
      obtaining a suitable disk drivel; and
      storing the self-executing restore program and the extended parts list on said suitable disk drive.

6. The system of claim 5 wherein the self-executing restore program and the extended parts list are stored in a host protected area of the disk drive.

7. A system for creating a hard disk drive for restoring a computer, the system comprising:
   processing means for receiving a request for a new disk drive for an identified customer computer system;
   memory storage means storing an extended parts list and a self-executing restore program for at least one identified customer computer system, said self-executing program, when executed, restoring the computer system to original factory condition;
   means for writing said restore program to the new disk drive; and
   means for writing the extended parts list on-to the new disk drive for use by said self-executing restore program in restoring the computer.

8. A method of restoring a computer system to factory condition, the method comprising:
   installing a factory-provided replacement hard disk drive into the computer system;
   powering up the system;
   automatically executing a restore script provided on the replacement hard disk drive;
   automatically using an extended parts list on the replacement hard disk drive to select operating system drivers to create an operating system restored to factory condition; and
   automatically rebooting into the restored operating system.

9. The method of claim 8 wherein said restore script is stored in a host protected area of the replacement hard disk drive.

10. The method of claim 9, further comprising,setting maximum hard drive address to ensure automatically rebooting into the restored operating system.

11. The method of claim 8 wherein the replacement hard disk drive is provided with operating system code and application code, and wherein the restore script uses said operating system code and application code in conjunction with said extended parts list to restore the computer system to the original factory condition.

12. A computer readable storage medium having instructions thereon for causing one or more computers to perform a method of restoring a system, the method comprising:
   receiving a request for a new disk drive for an identified customer computer system;
   retrieving an extended parts list for the identified customer computer system;
   providing a self-executing restore program on the new disk drive said self-executing restore program, when executed, restoring the computer system to original factory condition; and
   storing the extended parts list on the new disk drive for use by the self-executing restore program in restoring the computer system so that upon installation of the new drive, the self-executing restore program restores the computer system to the original factory condition.

13. The computer readable storage medium of claim 12 wherein the restore program and extended parts list is stored on the new disk drive in a host protected area.

14. The computer readable storage medium of claim 12 wherein the new disk drive also contains operating system and application software to install on the customer identified computer system consistent with the extended parts list.

* * * * *